(12) United States Patent
Walterscheid

(10) Patent No.: US 6,327,816 B1
(45) Date of Patent: Dec. 11, 2001

(54) SIPHON APPARATUS FOR WATERING A CHRISTMAS TREE

(76) Inventor: Kelly F. Walterscheid, 611 N. Delmar, Mesa, AZ (US) 85203

(*) Notice: Subject to any disclaimer, the term of this patent is extended or adjusted under 35 U.S.C. 154(b) by 0 days.

(21) Appl. No.: 09/348,993

(22) Filed: Jul. 7, 1999

(51) Int. Cl.[7] .............................. A47G 7/02; A47G 33/12
(52) U.S. Cl. ............................................. 47/40.5; 47/62 R
(58) Field of Search ................................ 47/40.5, 62 R, 47/79, 48.5

(56) References Cited

U.S. PATENT DOCUMENTS

| | | | |
|---|---|---|---|
| 3,137,969 | * 6/1964 | Sokol | 47/40.5 |
| 4,653,224 | * 3/1987 | Weckesser | 47/40.5 |
| 4,825,587 | * 5/1989 | Stancil | 47/40.5 |
| 5,090,443 | * 2/1992 | Jacobsen | 47/40.5 |
| 5,157,868 | * 10/1992 | Munoz | 47/40.5 |
| 5,369,910 | * 12/1994 | Copenhaver | 47/40.5 |
| 5,473,837 | * 12/1995 | Skoczylas et al. | 47/40.5 |
| 5,596,839 | * 1/1997 | Ellis-El | 47/79 |
| 5,779,215 | * 7/1998 | DeMasi | 248/523 |
| 6,145,250 | * 11/2000 | Mai | 47/79 |

* cited by examiner

Primary Examiner—Charles T Jordan
Assistant Examiner—Judith Nelson
(74) Attorney, Agent, or Firm—H. Gordon Shields

(57) ABSTRACT

Christmas tree stand watering apparatus includes a water container which may be located somewhat remotely from a Christmas tree stand and then a conduit extends from the container into the Christmas tree stand. In the embodiment illustrated, the container comprises a pair of reservoir elements, with a connecting conduit connecting the two reservoir elements. A relatively long conduit extends from the connecting conduit to the Christmas tree stand. A pump, with appropriate check valves, is disposed in the conduit for starting the siphon action from the container to the Christmas tree stand. An element, which may be metallic element, is disposed in the conduit to keep the bottom of the conduit from contacting the bottom of the Christmas tree stand and the element extends upwardly within the conduit to provide a stable and secure routing path over the top wall of a stand. A shut off valve may be secured to the end of the conduit in the stand to shut of the flow of water in the event of an accidental removal of the conduit from the stand.

26 Claims, 4 Drawing Sheets

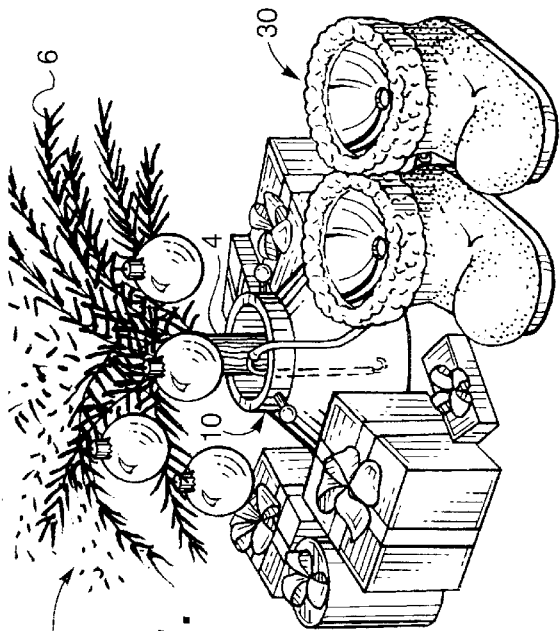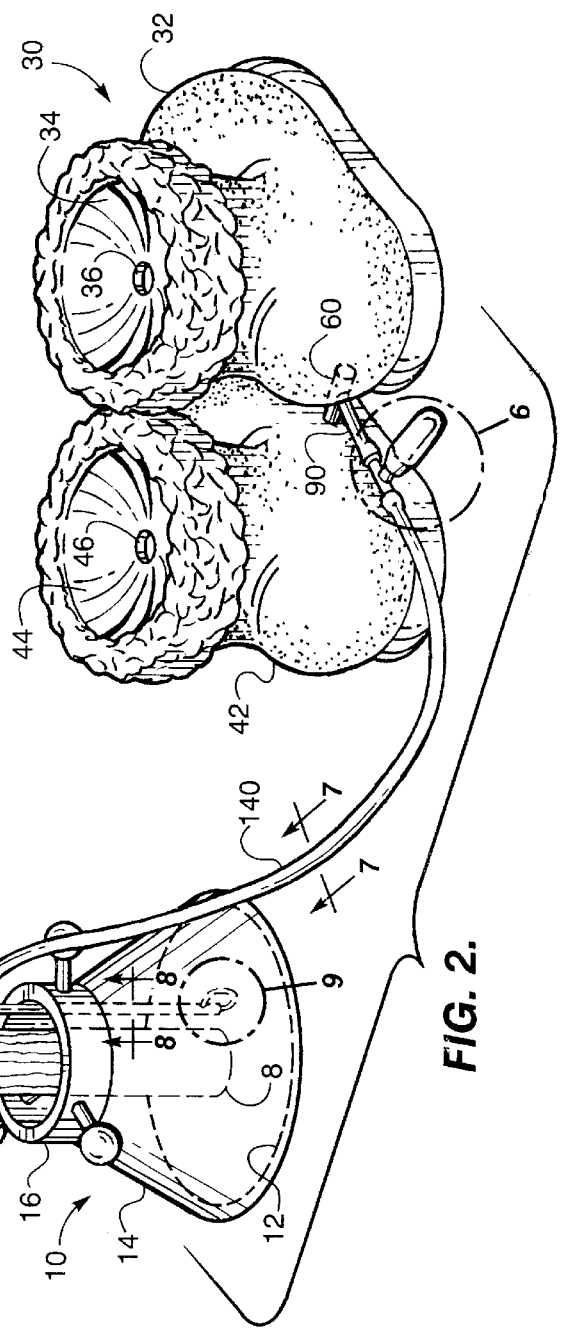

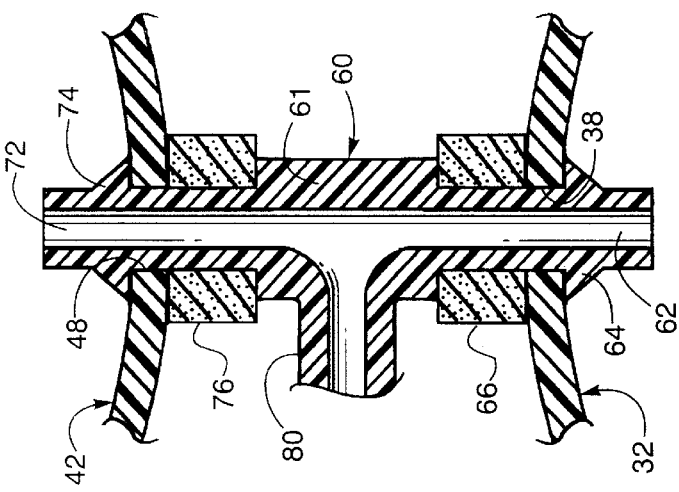
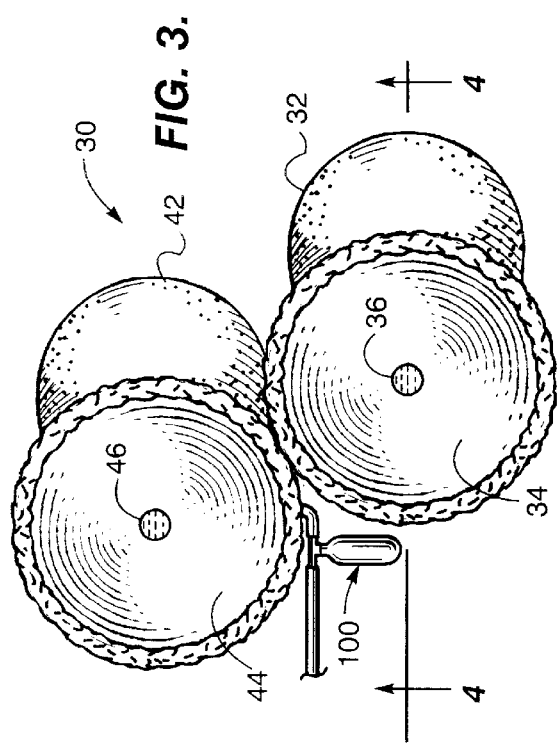
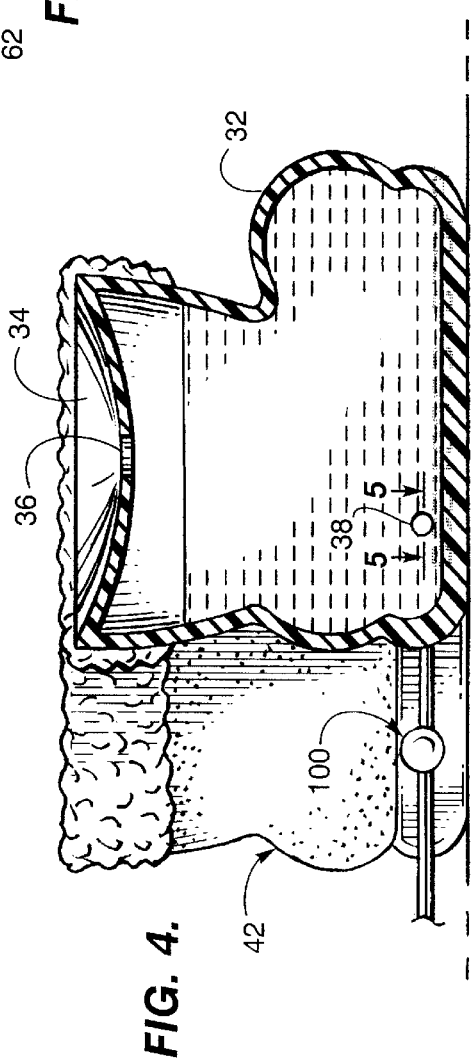

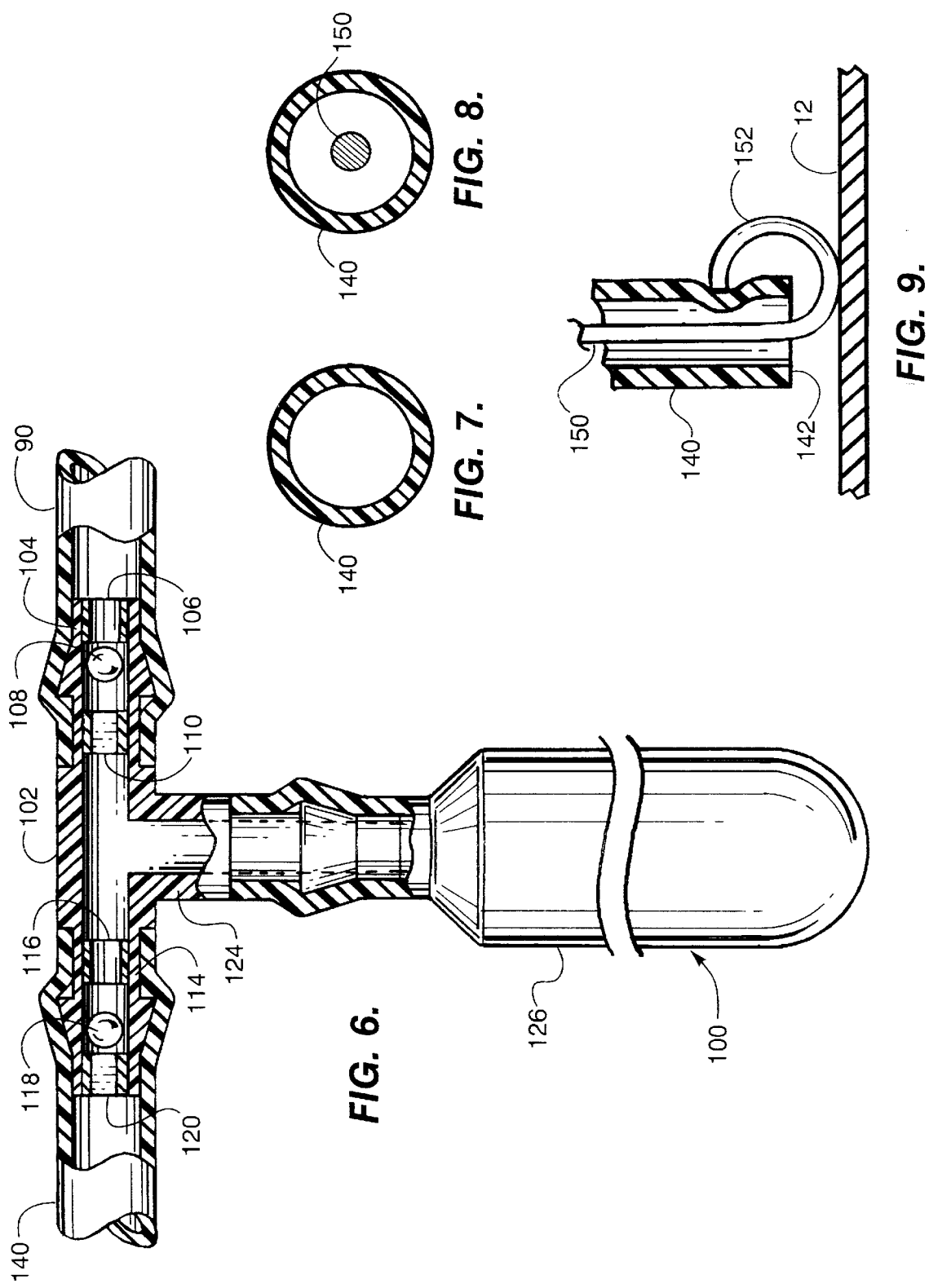

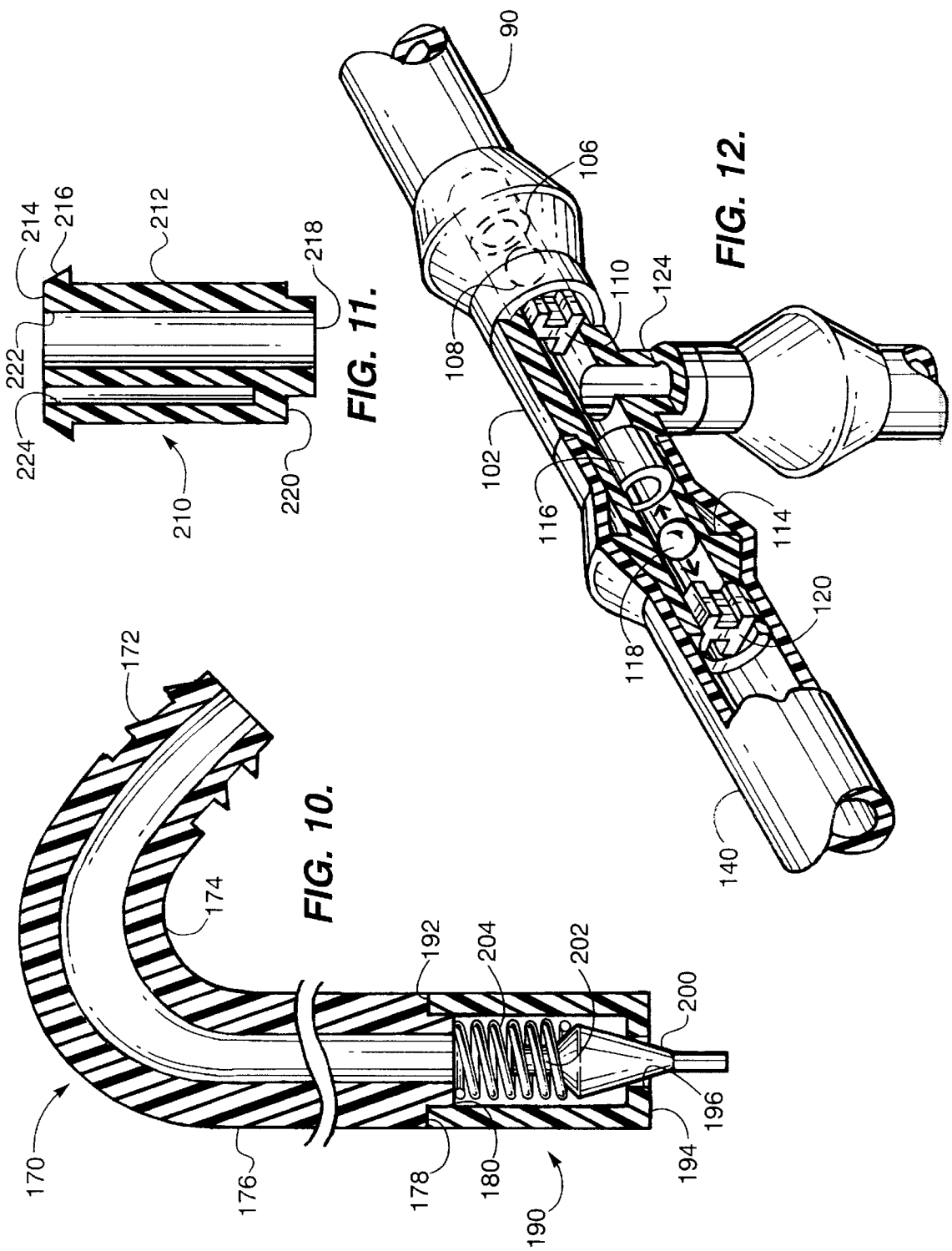

SIPHON APPARATUS FOR WATERING A CHRISTMAS TREE

BACKGROUND OF THE INVENTION

1. Field of the Invention

This invention relates to Christmas tree watering apparatus and, more particularly to siphon apparatus for siphoning water from a container to a Christmas tree in a Christmas tree stand.

2. Description of the Prior Art

The watering of Christmas trees has always been a problem. Christmas trees need to be watered to keep them from drying out as time passes. The manner in which the Christmas trees are watered becomes a problem. Typically, Christmas tree stands are covered by a decorative covering and Christmas presents are then placed around the stand. It is accordingly rather difficult to get to the stand, remove at least a portion of the cover, and put fresh water into the stand.

At least one U.S. Patent has attempted to solve the watering problem. U.S. Pat. No. 4,653,24 (Weckesser) discloses a Christmas tree stand, and a reservoir for holding, a quantity of water is connected to the stand by a conduit. A siphoning action is started by raising the reservoir. The conduit includes a crush-resistant end in the stand.

A limitation of the '224 patent is, of course, the requirement of starting the siphon action by raising the reservoir.

The apparatus of the present invention overcomes the problems of the prior art by providing a container for water that may be located at a distance away from the Christinas tree stand and may utilize siphon action for allowing the water to move from the container to the Christmas tree stand. The siphon action is started by a pump. The container may be refilled, as needed, in a relatively simple manner.

SUMMARY OF THE INVENTION

The invention described and claimed herein comprises a container, illustrated as including two receptacles, or reservoirs, connected together, and a tubular conduit extending from the container to a Christmas tree stand. In the conduit is a pump with appropriate check valves to start the siphon action. The check valves provide a one way flow of water from the container to the stand. As illustrated, the container comprises a pair of "Santa's Boots" with a tubular connecting conduit extending between them and a conduit from the connecting conduit extends outwardly to the Christmas tree stand. A metal insert is disposed in the remote end of the conduit which is placed in the Christmas tree stand, with a portion of the metal disposed on the bottom of the Christmas tree stand to prevent the conduit from actually contacting the bottom of the stand. Curvature at the top of the metallic element provides strain relief in the conduit and also prevents the accidental removal of the conduit from the stand.

Among the objects of the present invention are the following:

To provide new and useful Christmas tree stand watering apparatus;

To provide new and useful siphon apparatus for providing water for a Christmas tree stand;

To provide new and useful container apparatus for watering a Christmas tree stand;

To provide new and useful container apparatus for watering a Christmas tree stand from a location spaced slightly apart from the stand; and To provide new and useful Christmas tree watering apparatus including a siphon pump for starting a siphon action.

BRIEF DESCRIPTION OF THE DRAWING

FIG. 1 is a perspective view of the apparatus of the present invention in a use environment.

FIG. 2 is an enlarged view of the apparatus of the present invention.

FIG. 3 is a top view of the apparatus of the present invention.

FIG. 4 is a view in partial section taken generally along line 4—4 of FIG. 3.

FIG. 5 is an enlarged view in partial section taken generally along line 5—5 of FIG. 4.

FIG. 6 is an enlarged view in partial section taken generally from circle 6 of FIG. 2.

FIG. 7 is an enlarged view in partial section taken generally along line 7—7 of FIG. 2.

FIG. 8 is an enlarged view in partial section taken generally along line 8—8 of FIG. 2.

FIG. 9 is an enlarged view in partial section taken generally from Circle 9 of FIG. 2.

FIG. 10 is a view in partial section of an alternate embodiment of a portion of the apparatus of the present invention.

FIG. 11 is a view in partial section of another alternate embodiment of a portion of the present invention.

FIG. 12 is a perspective view in partial section of a portion of the apparatus of the present invention.

DESCRIPTION OF THE PREFERRED EMBODIMENT

FIG. 1 is a perspective view of siphon apparatus 30 of the present invention in its use environment. The use environment comprises a Christmas tree 2 which includes a trunk 4 and a plurality of decorated branches 6. The trunk 4 extends into a Christmas tree stand 10. Details of the Christmas tree stand 10 and the siphon apparatus 30 are also shown in FIG. 2, which comprises an enlarged view of the apparatus 30 and the trunk 4 and stand 10 which are illustrated in dash dot line. FIG. 3 is a top view of the siphon apparatus 30, while FIG. 4 is a view in partial section of the apparatus 30 taken generally along line 4—4 of FIG. 3. For the following discussion, reference will primarily be made to FIGS. 1, 2, 3, and 4.

The stand 10 includes a bottom 12 and a side wall 14 extending upwardly from the bottom 12. The side wall 14 includes an upper wall portion 16, and a plurality of screws 18 are shown extending through the upper wall portion 16. The screws 18 extend to the trunk 4 to hold the trunk 4, and the tree 2, generally vertically relative to the stand 10. The tree 2 includes a bottom 8 of the trunk 4. The bottom 8 is shown in FIG. 2. Typically, there will be a spike (not shown) of some kind on the bottom 12 of the stand 10, and the bottom 8 will be impaled on the spike or rib to help stabilize the tree 2 in the stand. Obviously, there are many different configurations of stands, and the apparatus of the siphon apparatus 30 of the present invention will function appropriately with all of them.

The siphon apparatus 30 comprises a pair of receptacle or reservoir elements 32 and 42 which are configured as boots, or "Santa Claus Boots," for purposes of being decorative items, as well as functional items. The boot reservoirs 32 and 42 comprise a container for holding water which flows under siphon principles to the stand 10.

The boot reservoir 32 includes a top lid 34 with a fill aperture 36 extending through the lid 34. At the bottom of the boot reservoir 32 is a drain aperture 38.

The boot reservoir 42 includes a top lid 44 and a fill aperture 46 extends through the lid 44. The lids 34 and 44 are concave and thus essentially comprise funnels to facilitate filling the reservoirs with water. The boot reservoir 42 also includes a drain aperture 48. The two drain apertures for the boot reservoirs 32 and 42 are connected by a conduit 60. The conduit 60 is best shown in FIG. 5. FIG. 5 comprises an enlarged view in partial section, with the drain apertures 38 and 48 for the boot reservoirs 32 and 42, respectively, shown. Reference will primarily be made to FIG. 5 for the following discussion.

The connecting conduit 60 comprises a tee element which includes an arm 62 extending through the drain aperture 38. The arm 62 includes a lock element 64 which locks the arm 62 to the reservoir 32 at the drain aperture 38. A seal element 66 is disposed about the arm 62 on the outer side of the aperture 38 to seal the arm 62 at the aperture 38 to the main body 61 of the connecting conduit 60. The seal 66 is disposed between a shoulder of the body 61 and the arm 62. Another seal element, not shown, may be disposed in the reservoir 32 about the lock element 64, if desired.

The connecting conduit 60 also includes an arm 72 which is substantially identical to the arm 62. The arm 62 includes a lock element 74 which extends through the aperture 48 and secures the arm 72 to the reservoir 42. A seal element 76 is disposed about the arm 72 between the wall of the reservoir 42 at the drain aperture 48. The seal element 76 is disposed against a shoulder at the main body 61, substantially identical to the placement of the seal element 66 with respect to the arm 62 and the boot reservoir 32. Again, a seal element (not shown) may be placed in the reservoir 42 about the lock element 74, if desired.

The connecting conduit 60 also includes an arm or tee base 80 extending generally perpendicular to the aligned arms 62 and 72. A conduit 90 is appropriately secured to the arm 80. The conduit 90 extends to a manual siphon pump assembly 100.

Details of the siphon pump 100 are shown in FIG. 6, which comprises a view in partial section of a portion of the siphon pump 100 and its adjacent conduit elements, namely the conduit 90 which extends from the arm 80 of the connecting conduit 60, and a flexible conduit 140 which extends from the siphon pump 100 to the stand 10 and in FIG. 12, which is a perspective view in partial section of the elements shown in FIG. 6. For the following discussion, reference will primarily be made to FIG. 6 and FIG. 12.

The siphon pump assembly 100 includes a tee element 102 which includes a pair of oppositely extending arms 104 and 114. In the arm 104 there is a valve conduit 106 spaced apart from an I-beam restrictor 110. The conduit 106 includes a bore 107. Between the valve conduit 106 and I-beam resistor 110 is a ball 108. The ball 108 has a smaller diameter than the inside diameter and the arm 104 but a larger diameter than the bore 107 of the conduit 106. The valve conduit 106 is placed upstream in the conduit 90 relative to the flow of water from the water container, namely the boot reservoirs 32 and 42, and the Christmas tree stand 10. The conduit 90 is appropriately secured to the arm 104.

The arm 114 includes a valve conduit 116 spaced apart from an I-beam restrictor 120. The conduit 116 includes a bore 117. A ball 118 is disposed between the conduit 116 and the restrictor 120. Again, the diameter of the ball 118 is less than that of the arm 114 but greater than that of the bore 117 of the conduit 116.

For the arm 114, the valve conduit 116 is upstream relative to the flow of water between the conduits 90 and 140.

The siphon pump 100 also includes an arm 124 which extends from the tee element 102 generally perpendicular to the arms 104 and 114. A bulb 126 is appropriately secured to the arm 124.

The purpose of the bulb 126 is, of course, to begin the siphon action to cause water to flow from the container elements 32 and 42 to the Christmas tree stand 10 through the respective conduits, as discussed above. It will be understood that the manually squeezing of the bulb 126 will cause the ball 108 to seat against the conduit 106 and will cause the ball 118 to move against the restrictor 120. Thus, no air or water will flow into the conduit 90, but water will flow from the bulb 126 into the conduit 140. When the bulb 126 is released and after water is flowing out from the end of the conduit 140, the lower pressure in the tee element 102 will allow atmospheric pressure in container elements or reservoirs 32 and 42 to begin siphon action, which is well known and understood. Hence, water will flow from the container, defined by the two reservoirs 32 and 42, through the conduits 90 and 140 to the Christmas tree stand 10 regardless of the elevation of conduit 140 with respect to reservoirs 32 and 42. This is best shown in FIGS. 2, 7, 8, and 9.

FIG. 7 is a view in partial section through the conduit 40 taken generally along line 7—7 of FIG. 2. FIG. 7 shows a conduit 140 open, for conveying water from the container which is comprised of the boot reservoirs 32 and 42, to the stand 10.

FIG. 8 is a view in partial section through the conduit 40 taken generally along line 8—8 of FIG. 2, showing the conduit 140 with a metal rod 150 disposed therein.

FIG. 9 is an enlarged view in partial section taken generally from circle 9 of FIG. 2, showing the conduit 140 within the stand 10. For the following discussion, reference will primarily be made to FIGS. 2 and 9.

The rod 150, which is preferably made of brass or other water non-corrosive material, includes a bottom loop 152 which extends downwardly from the conduit 140. The conduit 140 includes a distal end 142, and the bottom loop 152 of the rod 150 extends below the distal end 142 and is typically disposed on the bottom 12 of the stand 10. The loop 152 extends back to the conduit 140 and is disposed against the conduit 140 to help secure the rod 150 to the conduit 140, as best shown in FIG. 9. The rod 150 then extends upwardly within the conduit 140 and includes an upper bend 154. The bend 154 also defines a loop 144 in the conduit 140 and prevents the conduit from collapsing on itself at the loop 144, which may otherwise occur. The bend 154 may be made by a user of the apparatus adjacent to the upper wall portion 16 of the stand 10, or slightly above it. The rod 150 and its upper bend 154 and the loop 144 also serves as a strain relief for the conduit 140. The bend 154 and loop 144 also helps to prevent the accidental removal of the conduit 140 from the stand 10.

The bottom loop 152 keeps the bottom or distal end 142 of the conduit 140 off the bottom 12 of the stand 10 and accordingly helps to prevent blockage of the conduit 140, which may otherwise occur.

It will be noted that as long as the height of the water in the reservoir 32, 42 of the apparatus 30 is higher than the water in the stand 10, water will flow by siphon action through the various conduits 60, 90, and 140, and the check valves, as discussed above. As water is used from the stand 10, it will be replenished from the container elements or reservoirs 32, 42. The remote location of the container elements or reservoirs 32, 42 allows the water to be replenished easily and conveniently regardless of the height of loop 144 at the upper portion of the wall 16. Thus, the heights of the tree stand wall 16, with respect to the height of the reservoirs 32 and 42 is relatively unimportant, and siphon action will still occur, providing that there is a difference between the height of the water in the reservoir 32, 42 and the bottom 142 of the conduit 140.

Moreover, it will be noted that the rod 150 may be disposed on the outside or integrated into the conduit 140 and secured thereto. In such case, the "rod" may actually be appropriately configured plate, or the like. Also, the "rod" or plate, or whatever, need not be made of metal, but may be made of any appropriate material which is relatively non-corrosive in water and which provides the desired rigidity.

FIG. 10 is a view in partial section of an alternate embodiment of a portion of the apparatus of the present invention. A valve adapter 170 is utilized in place of the lower portion of the conduit 140, including the distal end 142 and the loop 144. In the embodiment of FIG. 10, the adapter 170, which is preferably made of rigid material, such as plastic, mates with a shut off valve 190 to prevent a flooding situation if the conduit 140 is pulled free, or out of the stand 10.

If the adapter 170 and valve 190 are used, then a brass rod 150 may not be necessary. In such case, the brass rod 150 is simply removed from the conduit 140, and the conduit is either shortened or the distal end 142 may be connected directly to a tubing connector portion 172 on the adapter 170.

The adapter 170 includes an upper bend portion 174 which then replaces the loop 144 in the conduit 140. The adapter 170 is simply placed over the top of the tree stand, with the upper bend portion 174 disposed on the wall of the tree stand or in the general area thereof. The adapter 170 includes a straight lower portion 176 and a shoulder 178 adjacent to a bottom end 180. The shoulder 178 receives the upper portion of the valve 190.

The shut off valve 190 includes a bottom wall 194 remote from the upper end 192. An orifice 196 extends through the bottom wall 194.

A tapered valve element 200 is disposed in the orifice 196. A stem 202 extends upwardly from the upper part of the valve element. The tapered valve element 200 is biased within the valve such that the tapered portion closes the orifice 196. The valve element 200 is biased by a compression spring 204. The spring 204 extends about the stem 202 and is disposed against the bottom end 180 of the adapter 170.

The spring 204 is a relatively light weight spring such that when the bottom of the valve element 200 contacts the bottom 12 of the stand 10 (see FIG. 9) the element 200 is moved upwardly in the orifice 196 to allow water to flow from the conduit 140, to the adapter 170, and through the orifice 196 into the stand 10. However, if the adapter 170, secured to the conduit 140, is removed from the stand 10, then the spring 204 biases the valve element 200 in the valve 190 against the orifice 196 to prevent the flow of water outwardly. The valve element 200 accordingly comprises a seal to prevent inadvertent flooding, or the like, in case the conduit 140 and the adapter 170 are inadvertently removed from the stand 10, and also, of course, prevents such flooding or dripping at the conclusion of the Christmas season when the conduit 140 and the adapter 170, with the valve 190 secured thereto, are removed from the Christmas tree stand.

Under some circumstances it may be desirable to simply add the valve 190 to the end of the conduit 140 with the brass rod in place. In such case, an adapter 210 may be used. FIG. 11 comprises a view in partial section of an adapter 210 for mating a valve 190 directly to the end 142 (see FIG. 9) of the conduit 140.

The element 210 may be referred to as an interconnector because it comprises an intermediate element between the valve 190 and the tubing 140.

The interconnector 210 includes a generally cylindrical portion 212 with a top 214 and a connector flange 216 extending outwardly from the top 214. The connector flange 216 extends into the bottom of the tube 140 at the bottom end 142. The cylinder 212 includes a bottom 218 and adjacent to the bottom 218 there is a shoulder 220. The shoulder 220 is comparable to the connector shoulder 178 of the adapter 170. The valve 190 is disposed on the shoulder 220.

Extending through the cylinder 212 is a bore 222 which receives the water flow from the tubing 140. A second bore 224 extends into the cylinder 212 generally parallel to the bore 222. However, the bore 224 does not extend all the way through the cylinder 212, while the bore 222 does extend all the way, longitudinally, through the cylinder 212. The purpose of the bore 224 is to receive the brass rod 150. The bottom loop 152 of the brass rod will, of course, be cut off, while the lower portion of the brass rod is thus enabled to extend into the bore 224.

Thus, there are various elements to allow the siphon apparatus 30 to be used with virtually any type of tree stand and to enable the apparatus to be used under varying circumstances, depending on the user's circumstances and desires.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. For a tree stand having a bottom and a side wall, watering apparatus comprising in combination:
   container means for holding, a quantity of water;
   conduit means extending from the container means to the stand through which the water flows from the container means to the stand; and
   manual pump means connected to the conduit means for starting siphon action for the flow of water from the container means to the stand in the conduit means.

2. The apparatus of claim 1 in which the conduit means includes
   a flexible conduit extending from the container means to the stand,
   a bottom end on the conduit,
   a rod, including a first portion disposed on the bottom of the stand and a second portion attached to the conduit to keep the bottom end of the conduit from contacting the bottom of the stand.

3. The apparatus of claim 2 in which the conduit means further includes a shut off valve contacting the bottom of the stand and an adaptor secured to the bottom end of the conduit for securing the shut off valve to the conduit for stopping the water flow when the conduit is lifted.

4. The apparatus of claim 2 in which the conduit means further includes a loop in the rod above the side wall of the stand to help prevent the conduit from collapsing.

5. The apparatus of claim 4 in which the rod is disposed in the conduit.

6. The apparatus of the claim 5 in which the conduit means further includes a lower loop in the rod disposed against the conduit adjacent to the bottom end of the conduit to secure the rod to the conduit.

7. The apparatus of claim 1 in which the container means includes a pair of reservoirs, and the conduit means includes a first conduit extending from the pump means.

8. The apparatus of claim 7 in which each reservoir of the pair of reservoirs has the configuration of a boot.

9. The apparatus of claim 8 in which each reservoir includes a generally concave lid having a hole through which water flows for filling each reservoir.

10. The apparatus of claim 1 in which the manual pump means includes check valves for providing a one way flow of water from means to stand.

11. The apparatus of claim 10 in which the conduit means includes a first conduit extending from the container means to the pump means and a second conduit extending from the pump means to the stand, and the second conduit includes a bottom end in the stand.

12. The apparatus of claim 11 in which the conduit means further includes a rod disposed in the second conduit adjacent to the bottom end of the second conduit.

13. The apparatus of claim 12 in which the conduit means further includes a lower portion on the rod extending below the bottom end of the conduit to prevent the bottom end of the conduit from contacting the bottom of the stand.

14. The apparatus of claim 13 in which the conduit means further includes a loop in the rod remote from the lower portion and extending over the side wall of the stand to prevent the second conduit from collapsing and from being accidentally removed from the stand.

15. The apparatus of claim 1 in which the conduit means includes a shut off valve disposed in the stand and contacting the bottom of the stand.

16. The apparatus of claim 15 in which the conduit means further includes
   a flexible conduit extending from the container means, and
   a rigid adapter secured to the flexible conduit adjacent to the stand, including a portion disposed in the stand, and the shut off valve is secured to the portion of the adaptor disposed in the stand.

17. Watering apparatus for watering a Christmas tree in a Christmas tree stand having a bottom wall and a side wall comprising in combination:
   reservoir means for holding a quantity of water remote from the stand;
   conduit means, including a first conduit and a second conduit, extending from the reservoir means to the stand;
   pump means in the conduit means between the first and second conduits for pumping water in the first conduit to begin a siphon action from the reservoir means to the stand in the second conduit.

18. The apparatus of claim 17 in which the second conduit extends from the pump means to the stand, including a loop portion disposed over the side wall of the stand.

19. The apparatus of claim 18 in which the conduit means further includes a rod disposed in the second conduit in the stand.

20. The apparatus of claim 19 in which the second conduit includes a bottom end and the rod includes a first portion extending from the bottom end and disposed on the bottom of the stand to prevent the bottom end of the second conduit from contacting the bottom of the stand.

21. The apparatus of claim 20 in which the rod includes an upper loop in the loop portion of the second conduit to prevent the second conduit from collapsing at the loop portion.

22. The apparatus of claim 21 in which the reservoir means includes a pair of reservoirs joined together by the first conduit.

23. The apparatus of claim 22 in which the pair of reservoirs is in the configuration of a pair of boots.

24. The apparatus of claim 17 in which the conduit means further includes a shut off valve disposed on the bottom wall of the stand.

25. The apparatus of claim 24 in which the conduit means further includes an adaptor secured to the shut off valve for supporting the shut off valve in the stand.

26. The apparatus of claim 25 in which the adaptor includes an upper portion disposed on the side wall of the stand.

* * * * *